United States Patent
Stoychev

(10) Patent No.: US 7,693,819 B2
(45) Date of Patent: Apr. 6, 2010

(54) DATABASE ACCESS SYSTEM AND METHOD FOR TRANSFERRING PORTIONS OF AN ORDERED RECORD SET RESPONSIVE TO MULTIPLE REQUESTS

(75) Inventor: Mladen L. Stoychev, Sofia (BG)

(73) Assignee: SAP AG, Walldorf (DE)

( * ) Notice: Subject to any disclaimer, the term of this patent is extended or adjusted under 35 U.S.C. 154(b) by 323 days.

(21) Appl. No.: 11/323,606

(22) Filed: Dec. 29, 2005

(65) Prior Publication Data

US 2007/0156642 A1    Jul. 5, 2007

(51) Int. Cl.
*G06F 17/30* (2006.01)
(52) U.S. Cl. .................. 707/2; 707/7; 707/10; 707/101; 707/102; 707/104.1; 709/201; 715/200
(58) Field of Classification Search .............. 707/2, 707/7, 100, 10, 101, 102, 104.1; 709/201; 715/200
See application file for complete search history.

(56) References Cited

U.S. PATENT DOCUMENTS

| | | | | |
|---|---|---|---|---|
| 5,918,224 A | * | 6/1999 | Bredenberg ............... 707/2 |
| 6,169,986 B1 | * | 1/2001 | Bowman et al. ............... 707/5 |
| 6,243,580 B1 | * | 6/2001 | Garner ................ 455/428 |
| 2004/0078224 A1 | * | 4/2004 | Schramm-Apple et al. ..... 705/2 |
| 2005/0160080 A1 | * | 7/2005 | Dawson ..................... 707/3 |
| 2005/0289140 A1 | * | 12/2005 | Ford et al. ................ 707/5 |
| 2006/0117002 A1 | * | 6/2006 | Swen ...................... 707/4 |
| 2006/0200462 A1 | * | 9/2006 | Kadayam et al. ............. 707/5 |

* cited by examiner

*Primary Examiner*—Hosain T Alam
*Assistant Examiner*—Jieying Tang
(74) *Attorney, Agent, or Firm*—Schwegman, Lundberg & Woessner, P.A.

(57) ABSTRACT

Each record added to a database is assigned an identifier, for example, based on or at the time the record is added to the database. A database server receives a request for a first group of records that satisfy a condition, and searches and sorts on the basis of the identifier field all records in the database that satisfy the condition, to create an ordered set of records. The server sends the first group of records from the ordered set, in response to the request, and also sends a starting point in the ordered set from which to begin to send a second group of records from the ordered set that satisfy the condition.

20 Claims, 1 Drawing Sheet

DATABASE ACCESS SYSTEM AND METHOD FOR TRANSFERRING PORTIONS OF AN ORDERED RECORD SET RESPONSIVE TO MULTIPLE REQUESTS

FIELD OF INVENTION

The field of invention relates generally to databases. In particular, the invention relates to a method for accessing a database.

BACKGROUND

It may not be possible or desirable to transfer without interruption or break large amounts of data from a database over a network in a client/server computing environment. What is needed is a method for transferring the large amounts of data in portions in such a way that the data already transferred and the data yet to be transferred can be readily tracked, so that the transfer can "pick up" where it left off, perhaps before the interruption or break.

SUMMARY

Records added to a database are assigned an identifier based on the time they are added to the database. A server with access to the database searches and sorts on the basis of identifier field all records in the database that satisfy one or more conditions specified in a query of the database received from a client, thereby generating an ordered set of records. A first group (page) or records is sent from the ordered set in response to the request, as is a starting point in the ordered set from which to begin to send any remaining records in the ordered set, e.g., a second group of records from the ordered set, that satisfy the same condition(s).

FIGURES

The present invention is illustrated by way of example and not limitation in the figures of the accompanying drawings, in which like references indicate similar elements and in which.

DETAILED DESCRIPTION

The invention provides a generic mechanism for sequentially retrieving portions (pages) of a data set. The mechanism is applicable for large amounts of data that cannot or should not be transferred in one communication stream from a server to a client over a network. In one embodiment of the invention, the data set is transferred in portions, continuing for an extended period time, and may even be interrupted for various reasons, including a shutdown of the client and/or server.

Figure 1:
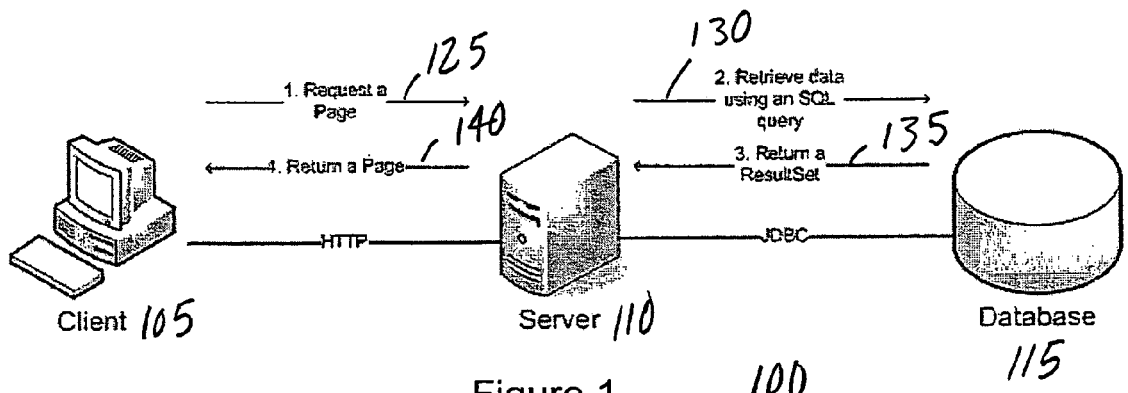
FIG. 1 illustrates a client/server architecture in which an embodiment of the invention may be used.

With reference to FIG. 1, a block diagram of a client/server distributed computing environment 100 is illustrated. For simplicity sake, a single client 105 is illustrated. However, it is appreciated that there may be a many to one relationship between clients and a server 110. In any case, the server has access to a local, persistent data store, for example, a database management system that includes a database 115 capable of holding a large amount of data. The server may operate as a database server with structured query language (SQL) query capabilities.

In one embodiment of the invention, a client, or more accurately, a software application executing on the client, receives input seeking a set of the data in the database. For example, a user may query the server 110 via a software application running on the client 105 for all records in the database 115 that relate to employees of one or more corporations that participate in a particular health insurance plan sponsored by the corporations. As can be appreciated from this example, given a number of large corporations, each with tens of thousands of employees that belong to the particular health insurance plan that the company sponsors, even the set of records ("set of data", "data set", or simply, "set") that satisfies the query may involve large amounts of data.

The data set may be defined by a filter, which essentially is a set of conditions that the set of data satisfies. The aim, of course, is to transfer the set from the server to the client. In the above example, the conditions specify certain corporations, a particular health insurance plan, and only those employees of that those corporations that participate in the particular plan. In one embodiment of the invention, upon receiving the user's query, the set is created and sorted at the server in a particular order, and then transferred in small portions ("groups", "pages", etc.) in separate requests. The page size, that is, the number of records transferred in each request, can be configured to be any size, depending on the circumstances. For example, the user may configure a page size of 20 records per request with the understanding that such a number of records can be readily displayed on a particular display device, such as a computer monitor screen.

In one embodiment, for each request (for example, each time a user hits a "page down" function key on a keyboard) only one page of records is transferred to the client. A subsequent request continues with transferring a different page, for example, the next page, a previous page, or any other page, depending on whether the user is providing input that indicates (s)he is scrolling down, scrolling up, or jumping to different pages in the data set.

The time between requests many not be anticipated or known by the database server. For example, two separate requests may occur immediately one after another, or there may be a significant time interval between requests. For example, the client and/or server may be shut down for some time between the requests, or more commonly, a user may be interrupted or take a break from issuing requests from the client. Additionally, the transfer protocol may be connectionless and asynchronous, e.g., HTTP, in which event the server is unable to exactly anticipate when the next request will be received. While the process of transferring the data set continues, request by request, the database may accept new data records. If the newly added data satisfies the filter, then this data should also be transferred to the client.

FIG. 1 shows the steps performed for each request. At 125, a user issues a request 125 from client 105. The server 110 receives the request and issues its own request to retrieve the corresponding data from database 115, for example, via an SQL statement at 130. The database returns a result—a page in the set to the server at 135. The server then returns the page to the client at 140. The interaction between the client and the server starts with request for the next page at 125 and ends with transfer of the page of records from the server to the client at 140. Importantly, server determines the next page of records, as discussed further below.

The data in the database is homogenous in one embodiment of the invention. The data is stored in the database as records of the same type. As indicated above, new records may be added to the database. In one embodiment, changes to existing records are not allowed once the transfer of the set is underway. In another embodiment, as described below, an existing record may be changed, so long as an identifier associated with the record is also modified in such a manner that the existing record is still deemed as yet to be retrieved by the client, even if the client in fact retrieved the record earlier in the transfer, prior to modification of the existing record.

In one embodiment of the invention, the set includes all records that satisfy the set of conditions defined by the client (i.e., by the filter, or set of conditions provided by the client). The set may grow with the time, because as suggested above, new records may be added to the database. Once the client has retrieved all records of the set, new records may be added to the database. In one embodiment of the invention, the client is able to continue retrieving the new records, by using a unique identifier from the last record retrieved in the last request as a starting point for subsequent requests.

Figure 2:
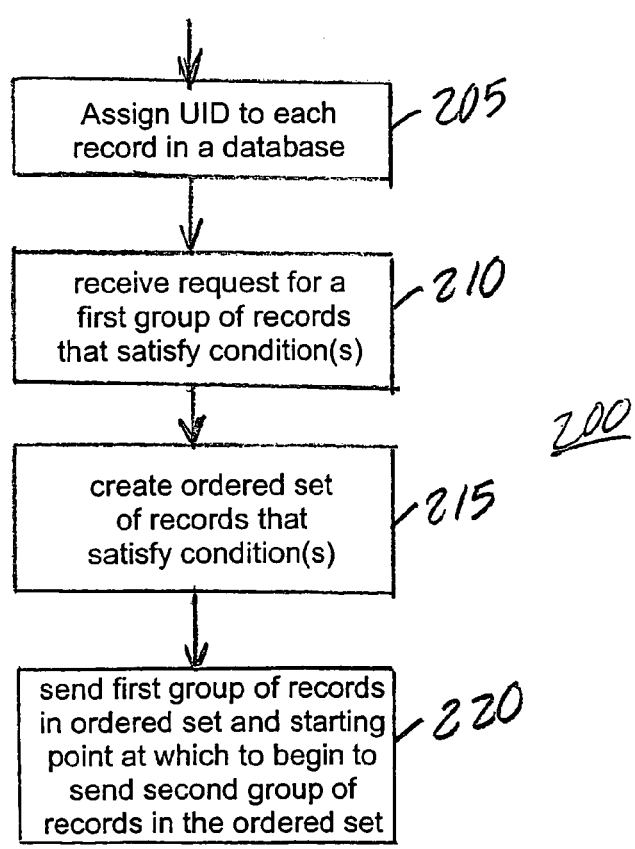
FIG. 2 is a flow diagram of one embodiment of the invention.

With reference to FIG. 2, in one embodiment 200 of the invention, each record in the database is assigned a unique identifier (UID) at 205. One way to achieve a UID is for the value of the UID to be based on, that is, increase with, time. In this approach, the earlier a record is entered in to the database, the smaller UID it has, and all UIDs are unique—no two records share the same UID.

Further, the records of a set are sorted lexicographically by their UID. When the server receives a request from a client for a first page of records that satisfy a filter at 210, the server creates an ordered set, first by searching for records that match the filter to create a set, and the sorting the records in the set to create an ordered set, at 215. The server then sends successive pages of records to the user in response to repeated requests, keeping track of the UID of the last record sent in response to each request as a starting point for the next group of records to be sent in response to a subsequent client request, at 220.

The UID of the last retrieved record determines the current position within the ordered set. The current position allows the server to distinguish the records transferred so far versus the ones not yet transferred. By way of further explanation, let $UID_p$ be the UID of the current position in the ordered set. The records in the ordered set can then be split in two groups: records with a $UID \leq UID_p$—that is, records already retrieved; and records with a $UID > UID_p$—that is, not yet retrieved.

When a new record is inserted in the database, it has the largest UID of all records in the database, i.e. $UID_{New} > ID_p$, which guarantees that the new record becomes a member to the set of records not yet retrieved by the client, and leaves open the possibility that the record will be provided to the client later if requested.

The invention may utilize the quick sorting and filtering capabilities of the database using SQL queries. Sorting is applied to the whole set of records that match the search filter criteria, to turn the set into an ordered set. Filtering may also be used to locate the next page of records, based on UID, in addition to being used to extract the set of records from the whole database, based on the search criteria (i.e., filter conditions).

The server may perform a first pseudo-query that retrieves all records in the set, which provides a count of all records in the set. The server may then perform a second pseudo-query that retrieves only the records that are not yet transferred to the client. The first N records of the result (the first N records with the smallest UIDs) are provided in the next page returned to the client, where N equals the size of the page (i.e., number of records).

In one embodiment of the invention, the filter for a given search is stored on the client and is sent to the server for each request. The filter remains the same for all requests. The current position ($UID_p$) may also be stored on the client and sent to the server on each request. The position changes after each request. After a page is received, the client updates and stores the new position. In one embodiment, the value of the current position ($UID_p$) is equal to the (maximal) UID of the records from the last page retrieved. The server may translate the filter provided by the client in each request to a WHERE clause of an SQL query. The server orders the data quickly by UID, and uses $UID_p$ to allocate the next page of records to be transferred from the set.

It is contemplated that an embodiment of the invention may retrieve pages sequentially in both directions, i.e. not only the next pages in ascending order, but also the previous pages in decreasing, or descending, order, so long as an initial position for the first retrieved page is maintained. The initial page is the first page in ascending order, because the end page in ascending order is not known.

To traverse the data set in both directions, first and last UIDs ($ID_{pFirst}$ and $ID_{pLast}$) for the last request (last retrieved page) are maintained, wherein the first and last UIDs represent the minimal and the maximal UIDs of the records from the last retrieved page. The pseudo-queries as may be generated by the server would be:

SELECT*FROM SET WHERE UID<$UID_{pFirst}$ ORDER BY UID DESCENDING

This query retrieves the previous page of records in reverse order. The condition UID<$UID_{pFirst}$ restricts the result to all records before the current page. The ordering is needed to locate the records of the previous page at the beginning of the result.

SELECT * FROM SET WHERE UID>$UID_{pLast}$ ORDER BY UID ASCENDING

This query retrieves the next page of records. The condition UID>$UID_{pLast}$ restricts the result to all records after the current page. The ordering is needed to locate the records of the next page at the beginning of the result.

In summary, a simple scenario in one embodiment includes preparing a filter from the client and retrieving the set of data by sequential requests for the next page until the data ends. A more complicated scenario includes traversing over the set forward and backward by sequential requests for the next and the previous page. For example, the user lists the data in tabular format and pages down and up to the respective next and previous pages displayed on a display device.

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions.

A computing system (such as a server) can execute program code stored by an article of manufacture. An applicable article of manufacture may include one or more fixed components (such as a hard disk drive or memory) and/or various movable components such as a CD ROM, a compact disc, a magnetic tape, etc. In order to execute the program code, typically instructions of the program code are loaded into a Random Access Memory (RAM) and a processing core then executes the instructions.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .Net environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is

1. In a database management system communicably interfaced with a database and a client, the database comprising a plurality of records, each record having a Unique Identifier (UID) assigned within the database, a method comprising:
    receiving, from the client, a client records request comprising a filter, a page size, and a UID position (UIDp), the filter specifying one or more conditions that records returned to the client responsive to the client records request must satisfy, the page size specifying a user configurable quantity of records to be transferred to the client responsive to the client records request, and the UIDp specifying a maximum UID value assigned to a record within a first group of records previously sent to the client which also satisfies the one or more conditions of the filter;
    creating an ordered record set comprising all records in the database satisfying the one or more conditions specified by the filter and sorted by the UID of each record;
    selecting a second group of records from the ordered record set, wherein the second group of records begins with a record having a UID greater than the UIDp received from the client, and wherein the quantity of records within the second group of records corresponds to the page size; and
    sending the second group of records to the client responsive to the client records request.

2. The method of claim 1, wherein the page size received from the client is based upon a quantity of records that can be readily displayed on a display device associated with the client.

3. The method of claim 1, further comprising:
    receiving, from the client, a second client records request comprising the filter, the page size, and a second UIDp, wherein the second UIDp specifies a maximum UID value of a record within the second group of records previously sent to the client;
    creating a new ordered record set comprising all records in the database satisfying the filter and sorted by the UID of each record;
    selecting a third group of records from the new ordered record set beginning with a record having a UID greater than the second UIDp received from the client, and wherein the quantity of records within the third group of records corresponds to the page size; and
    sending the third group of records to the client responsive to the second client records request.

4. The method of claim 1, further comprising:
    adding a new record to the database having a UID greater than all records previously in the database or modifying an existing record within the database and reassigning a new UID to the existing record which is greater than all other records previously in the database, or both; and
    updating the ordered record set after sending the second group of records to include all records in the database satisfying the one or more conditions specified by the filter, including the new record or the modified record, or both, and sorting the ordered record set by the UID of each record.

5. The method of claim 4, further comprising:
    receiving, from the client, a second client records request comprising the filter, the page size, and a second UIDp, wherein the second UIDp specifies a maximum UID value assigned to a record within the second group of records previously sent to the client;
    selecting, from the ordered record set previously updated, a third group of records beginning with a record having a UID greater than the second UIDp received from the client, and wherein the quantity of records within the third group of records corresponds to the page size; and
    sending the third group of records to the client responsive to the second client records request.

6. The method of claim 1, wherein the UID assigned to each record within the database is based on a time associated with the addition of each record to the database or an order in which each record is added to the database.

7. The method of claim 1, wherein the client records request is made via a connectionless transfer protocol, and wherein the database management system cannot anticipate whether or when a subsequent client records request will be received.

8. The method of claim 1, further comprising:
    receiving, from the client, a second client records request comprising the filter, the page size, and a UIDp First (UIDpFirst), wherein the UIDpFirst specifies a minimum UID value assigned to a record within the second group of records previously sent to the client;
    creating a new ordered record set comprising all records in the database satisfying the filter and sorted by the UID of each record in descending order;
    selecting a third group of records from the new ordered record set, wherein the first record of the third group of records has a UID less than the UIDpFirst, and wherein the quantity of records within the third group of records corresponds to the page size; and
    sending the third group of records in descending order to the client responsive to the second client records request.

9. A machine-readable medium having instructions stored thereon that, when executed by a processor in a database management system, cause the database management system to perform a method comprising:
    assigning a Unique Identifier (UID) to each of a plurality of records stored within a database communicably interfaced with the database management system;
    receiving, from a client, a client records request comprising a filter and a UID position (UIDp), the filter specifying one or more conditions that records returned to the client responsive to the client records request must satisfy, and the UIDp specifying a maximum UID value assigned to a record within a first group of records previously sent to the client which also satisfies the one or more conditions of the filter;

creating an ordered record set comprising all records in the database satisfying the one or more conditions specified by the filter and sorted by the UID of each record;

selecting a second group of records from the ordered record set, wherein the second group of records begins with a record having a UID greater than the UIDp received from the client; and sending the second group of records to the client responsive to the client records request.

10. The machine-readable medium of claim 9, wherein:

the client records request received from the client further comprises a page size specifying a user configurable quantity of records to be transferred to the client responsive to the client records request; and wherein selecting the second group of records from the ordered record set comprises limiting the quantity of records within the second group of records to the page size.

11. The machine-readable medium of claim 10, wherein the instructions cause the database management system to perform the method further comprising adding a new record to the database having a UID greater than all records previously in the database or modifying an existing record within the database and reassigning a new UID to the existing record which is greater than all other records previously in the database, or both.

12. The machine-readable medium of claim 11, wherein the instructions cause the database management system to perform the method further comprising:

receiving, from the client, a second client records request comprising the filter, the page size, and a second UIDp, wherein the second UIDp specifies a maximum UID value of a record within the second group of records previously sent to the client;

creating a new ordered record set comprising all records in the database satisfying the filter and sorted by the UID of each record;

selecting a third group of records from the new ordered record set beginning with a record having a UID greater than the second UIDp received from the client, and wherein the quantity of records within the third group of records corresponds to the page size; and sending the third group of records to the client responsive to the second client records request.

13. The machine-readable medium of claim 9, wherein the client records request is made via a connectionless transfer protocol, and wherein the database management system cannot anticipate whether or when a subsequent client records request will be received.

14. The machine-readable medium of claim 10, wherein the instructions cause the database management system to perform the method further comprising:

receiving, from the client, a second client records request comprising the filter, the page size, and a UIDp First (UIDpFirst), wherein the UIDpFirst specifies a minimum UID value assigned to a record within the second group of records previously sent to the client;

creating a new ordered record set comprising all records in the database satisfying the filter and sorted by the UID of each record in descending order;

selecting a third group of records from the new ordered record set, wherein the first record of the third group of records has a UID less than the UIDpFirst, and wherein the quantity of records within the third group of records corresponds to the page size; and sending the third group of records in descending order to the client responsive to the second client records request.

15. A database management system having a processor and memory therein and communicably interfaced between a database and a client, the database comprising a plurality of records, each record having a Unique Identifier (UID) assigned within the database, wherein the database management system comprises means for receiving, from a client, a client records request comprising a filter and a UID position (UIDp), the filter specifying one or more conditions that records returned to the client responsive to the client records request must satisfy, and the UIDp specifying a maximum UID value assigned to a record within a first group of records previously sent to the client which also satisfies the one or more conditions of the filter;

means for creating an ordered record set comprising all records in the database satisfying the one or more conditions specified by the filter and sorted by the UID of each record;

means for selecting a second group of records from the ordered record set, wherein the second group of records begins with a record having a UID greater than the UIDp received from the client; and means for sending the second group of records to the client responsive to the client records request.

16. The database management system of claim 15, wherein:

the client records request received from the client further comprises a page size specifying a user configurable quantity of records to be transferred to the client responsive to the client records request, the page size based upon a quantity of records that can be readily displayed on a display device associated with the client; and wherein selecting the second group of records from the ordered record set comprises means for limiting the quantity of records within the second group of records to the page size.

17. The database management system of claim 15, further comprising means for adding a new record to the database having a UID greater than all records previously in the database or modifying an existing record within the database and means for reassigning a new UID to the existing record which is greater than all other records previously in the database, or means for both; and means for updating the ordered record set after sending the second group of records to include all records in the database satisfying the one or more conditions specified by the filter, including the new record or the modified record, or both, and sorting the ordered record set by the UID of each record.

18. The database management system of claim 17, further comprising:

means for receiving, from the client, a second client records request comprising the filter and a second UIDp, wherein the second UIDp specifies a maximum UID value of a record within the second group of records previously sent to the client;

means for selecting, from the ordered record set, a third group of records beginning with a record having a UID greater than the second UIDp received from the client; and means for sending the third group of records to the client responsive to the second client records request, wherein the second client records request comprises a forward client records request for sequential records in ascending order.

19. The database management system of claim 18, further comprising:

means for sending a fourth group of records to the client responsive to a reverse client records request for previous records in descending order.

20. The database management system of claim 15, wherein the client records request is made via a connectionless transfer protocol, and wherein the database management system lacks means to anticipate whether or when a subsequent client records request will be received.

* * * * *